United States Patent [19]

Hawener et al.

[11] Patent Number: 4,872,624
[45] Date of Patent: Oct. 10, 1989

[54] DRIVE ARRANGEMENT FOR A VEHICLE HAVING A PROPELLER

[75] Inventors: Juergen Hawener, Moeglingen; Kim Havemann, Weissach; Rolf V. Sivers, Rutesheim, all of Fed. Rep. of Germany

[73] Assignee: Dr. Ing. h.c.f. Porsche AG, Stuttgart, Fed. Rep. of Germany

[21] Appl. No.: 198,446

[22] Filed: May 25, 1988

[30] Foreign Application Priority Data

May 26, 1987 [DE] Fed. Rep. of Germany ....... 3717632

[51] Int. Cl.⁴ ...................... B64D 27/00; B64D 35/00
[52] U.S. Cl. .................................. 244/54; 416/170 R
[58] Field of Search ...................... 244/54, 55, 65, 60, 244/903; 416/170 R

[56] References Cited

U.S. PATENT DOCUMENTS

| 1,659,098 | 2/1928 | Hall | 244/60 |
| 1,888,418 | 11/1932 | Adams | 244/65 |
| 2,220,514 | 11/1940 | D'Aubarede | 244/54 |
| 2,297,400 | 9/1942 | Friedrich | 244/60 |

OTHER PUBLICATIONS

"Design in Logic", *Flight*, pp. 70-71, Jul. 15th, 1948.
"Advanced-Design Lear Fan 2100", *Popular Science*, pp. 57-59, Jun. 1981.

Primary Examiner—Joseph F. Peters, Jr.
Assistant Examiner—Rodney Corl
Attorney, Agent, or Firm—Barnes & Thornburg

[57] ABSTRACT

A drive arrangement for an aircraft with a propeller, especially a thrust propeller arranged in the rear fuselage of an aircraft frame which is connected with a drive unit. The drive unit is connected with a longitudinally installed tubular support member supportingly receiving a central shaft. The tubular support member as well as the drive unit are supported on the side of the fuselage by way of at least three elastic bearing supports. One bearing support is provided at the aircraft rear end of the tubular support member and the two other bearing supports are provided within the area of the drive unit.

24 Claims, 8 Drawing Sheets

DRIVE ARRANGEMENT FOR A VEHICLE HAVING A PROPELLER

BACKGROUND AND SUMMARY OF THE INVENTION

The present invention relates to a drive arrangement for an aircraft with a propeller, especially with a thrust propeller arranged in the rear fuselage of an aircraft frame which is connected with a drive unit.

In an aircraft with a propeller (DE-PS No. 730 493), a central shaft for the drive is arranged between the propeller and an engine transmission-unit supported on the aircraft frame. The central shaft is rigidly supported in the rear fuselage of the aircraft frame whereby a further rigid fuselage bearing support is provided approximately centrally of the shaft. Such a bearing support is disadvantageous by reason of the rigid connection with the aircraft frame insofar as no body-insulating effect with respect to the aircraft frame can be achieved. Furthermore, with such an arrangement cardan or universal joints are required for the shaft between the propeller and the transmission whose fatigue vibrational loads as a result of relative movements of the engine to the propeller bearing support must be reduced by an interconnected costly slide element.

The present invention is therefore concerned with the task to provide a drive arrangement, essentially consisting of an engine-transmission-unit, of a propeller, and of a shaft, by means of which an arrangement and bearing support of the overall aggregate is realizable which has a favorable vibration behavior. Furthermore, the entire unit is to be installable into the aircraft frame in a simple manner with avoidance of costly adjusting operations.

The underlying problems are solved according to the present invention in that the drive unit is connected with a longitudinally installed tubular support member supportingly accommodating a central shaft and in that the tubular support member as well as the drive unit are supported on the side of the aircraft frame by way of at least three elastic bearing supports whereby the one bearing support is provided at the aircraft rear end of the tubular support member and the two other bearing supports are provided within the area of the drive unit.

The principal advantages achieved with the present invention reside in that a drive aggregate-unit closed in itself and essentially consisting of an engine, a transmission, a thrust propeller and a tubular support member with an inwardly disposed central shaft can be installed in a simple manner into the aircraft frame. The bearing support of this entire aggregate takes place within the area of the rear fuselage part by way of a single elastic bearing support and within the area of the engine-transmission unit by way of two further elastic bearing supports. The bearing supports are preferably located within low-vibration areas of the overall aggregate. These bearing supports are elastically constructed in the vertical and transverse direction for purposes of body-sound insulation and are preferably arranged in a horizontal plane extending through the center of gravity. Furthermore, the bearing supports are supported near the propeller axis in order that the bending stresses of the tubular support member can be kept small.

The shaft is constructed free of joints and with a relatively long construction of the tubular support member is supported sub-critically. With a relatively short shaft, by contrast, no intermediate bearing support of the central shaft is required so that in that case only end side bearing supports are to be provided.

The use of plastic material and/or a light metal for the tubular support member and for the shaft result in a central tubular aggregate light from a weight point of view, whereby with plastic material, a dimensioning corresponding to the occurring loads is possible within wide limits by selected winding angles of the fibers in the plastic material.

For the purpose of the propeller adjustment, a pressure oil line is extended through the hollow central shaft which is retained with respect to the shaft by way of support bearings that are arranged preferably in the plane of the shaft bearings and adjacent thereto and which support the thin and very long line and prevent critical bending vibrations. Additionally, the support bearings avoid an excessively strong constriction of the central shaft when pressing-on the intermediate bearings.

The tubular support member may also consist according to a further embodiment of the present invention of a funnel-shaped transmission cover which extends up to the thrust propeller and in which the central shaft is supported end-side. This transmission cover may also consist of plastic material.

The support bearings of the tubular support member provided in the fuselage rear part may at the same time form a rear cover for the end-face fuselage opening.

The entire aggregate is adjustable as regards bending and torsional vibrations for achieving a best possible operating quiet in the flight rotational speed range by correspondingly selected mass and strength distribution. This is achieved by a suitable selection of the diameter of the central shaft and of the tubular support member, respectively, of the wall thicknesses, whereby also the torsionally soft shaft plate provided within the area of the transmission between the engine and the propeller contributes thereto.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWINGS

Figure 1:
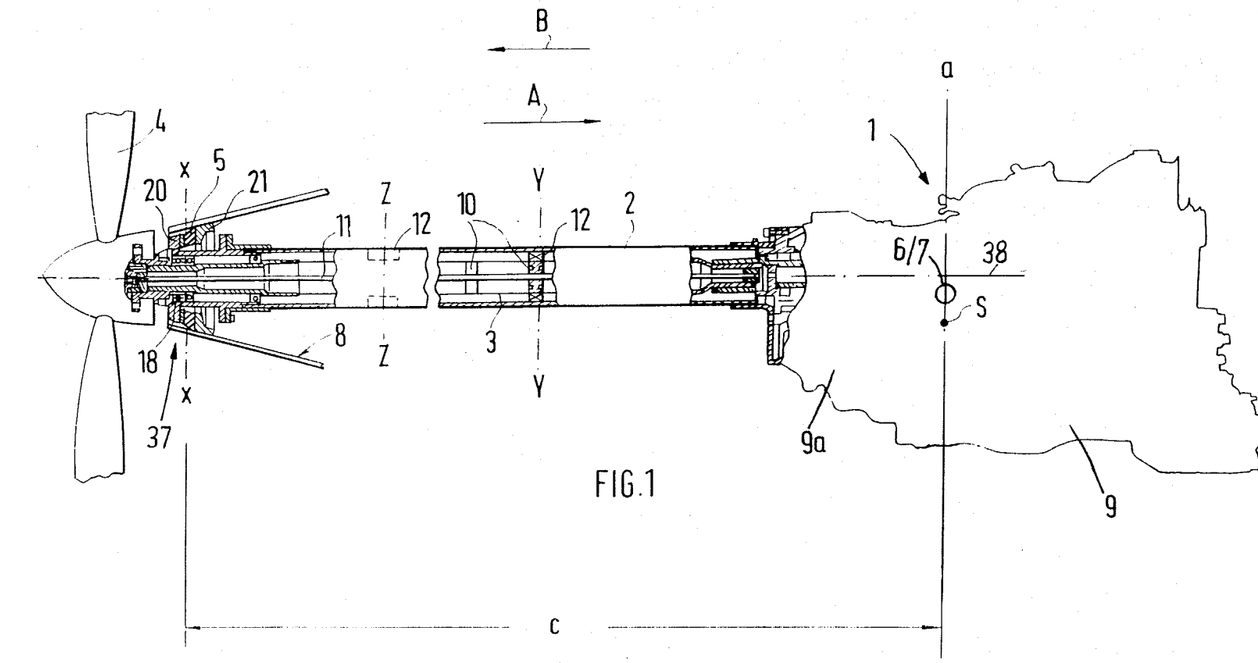
FIG. 1 is a side elevational view of the overall aggregate in accordance with the present invention, consisting of an engine-transmission-unit, of a tubular support member, of a central shaft supported therein and of a propeller with indicated aircraft fuselage.

Referring now to the drawing wherein like reference numerals are used throughout the various views to designate like parts, and more particularly to FIG. 1, as shown more fully in this figure, a longitudinally installed tubular support member 2 is rigidly connected with an engine-transmission-unit generally designated by reference numeral 1; a central shaft 3 which extends through the tubular support member 2, is drivingly connected with a thrust or pull propeller 4. The flight direction with a thrust propeller on the rear end is the direction of arrow A and with a front pull propeller is the direction of arrow B.

The entire aggregate, essentially consisting of the structural groups 1, 2, 3, and 4 is supported by way of three bearing supports 5, 6 and 7 with respect to the fuselage 8 of an aircraft frame. The one bearing support 5 is arranged at the rear aircraft end 37 of the tubular support member 2 and is supported with respect to the fuselage 8 whereby the two further bearing supports 6 and 7 are provided within the area of the unit 1.

The bearing support 5 as well as the bearing supports 6 and 7 of the drive aggregate 9, 9a are each arranged in low-vibration areas, such as in the vertical planes x—x and a—a. The plane a—a extends preferably through the center of gravity S of the entire aggregate. The bearing supports 5 have a relatively large base c with respect to the bearing supports 6 and 7. In particular, the bearing supports 6 and 7 are arranged near the propeller axis 38.

The tubular support member 2 consists of a plastic material reinforced with glass fibers whereby the central shaft 3 is made of a carbon-fiber-reinforced plastic material.

Figure 6:
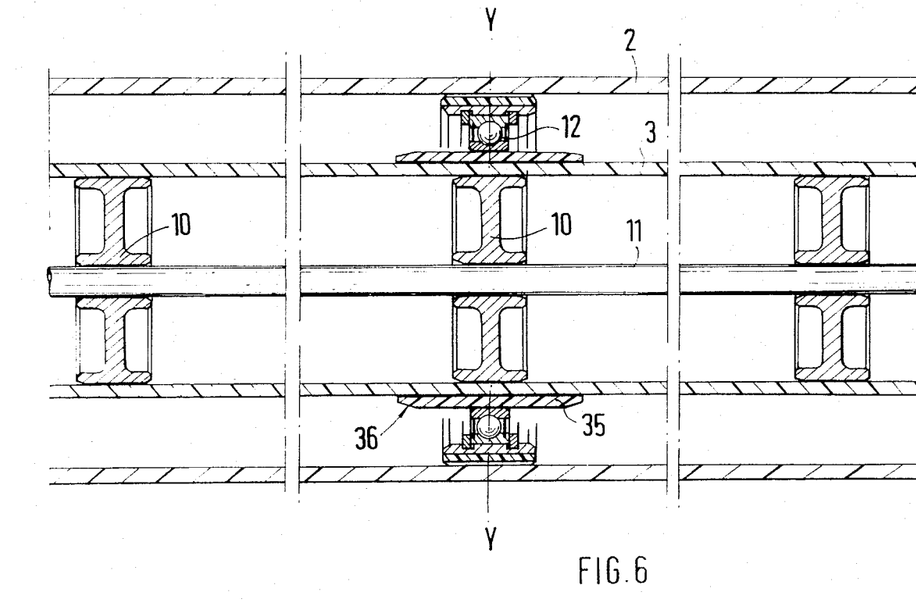
FIG. 6 is a cross-sectional view through an arrangement of the shaft bearings with support bearing for the pressure oil line in accordance with the present invention.

The central shaft 3 is constructed hollow and includes a pressure oil line 11 retained on the inside by way of support bearings 10. These support bearings 10 are preferably arranged in a vertical plane Y—Y and Z—Z with bearing supports 12 of the central shaft 11. Furthermore, further support bearings 10 may be arranged adjacent these planes as illustrated more fully in connection with FIG. 6.

The shaft bearing supports 12 are arranged on a ring 35 mounted over the central shaft 3 (FIG. 6) which has a bevelling 36 in the front and rear thereof. This ring 35 is to prevent a bulging of the central shaft 3 and to compensate for tolerances between the central pipe and the central shaft. In order that during an assembly the bearing support 12 can be slipped simply over this ring 35, the latter is provided with the bevelling 36.

Figure 2:
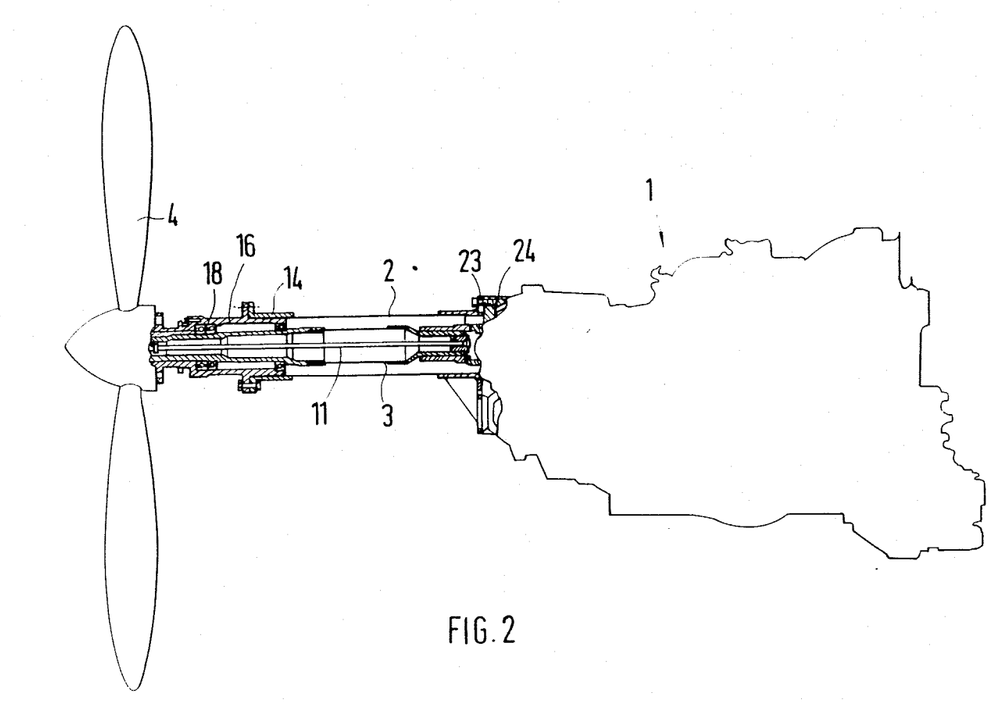
FIG. 2 is a side elevational view of a further embodiment of an overall aggregate with a short tubular support member in accordance with the present invention.

With a relatively long tubular support member 2 according to FIG. 1, the central shaft 3 is supported, for example, several times and more particularly undercritically. In Figure 2 a relatively short tubular support member 2 is shown which does not require any intermediate bearing supports for the central shaft 3.

Figure 4:
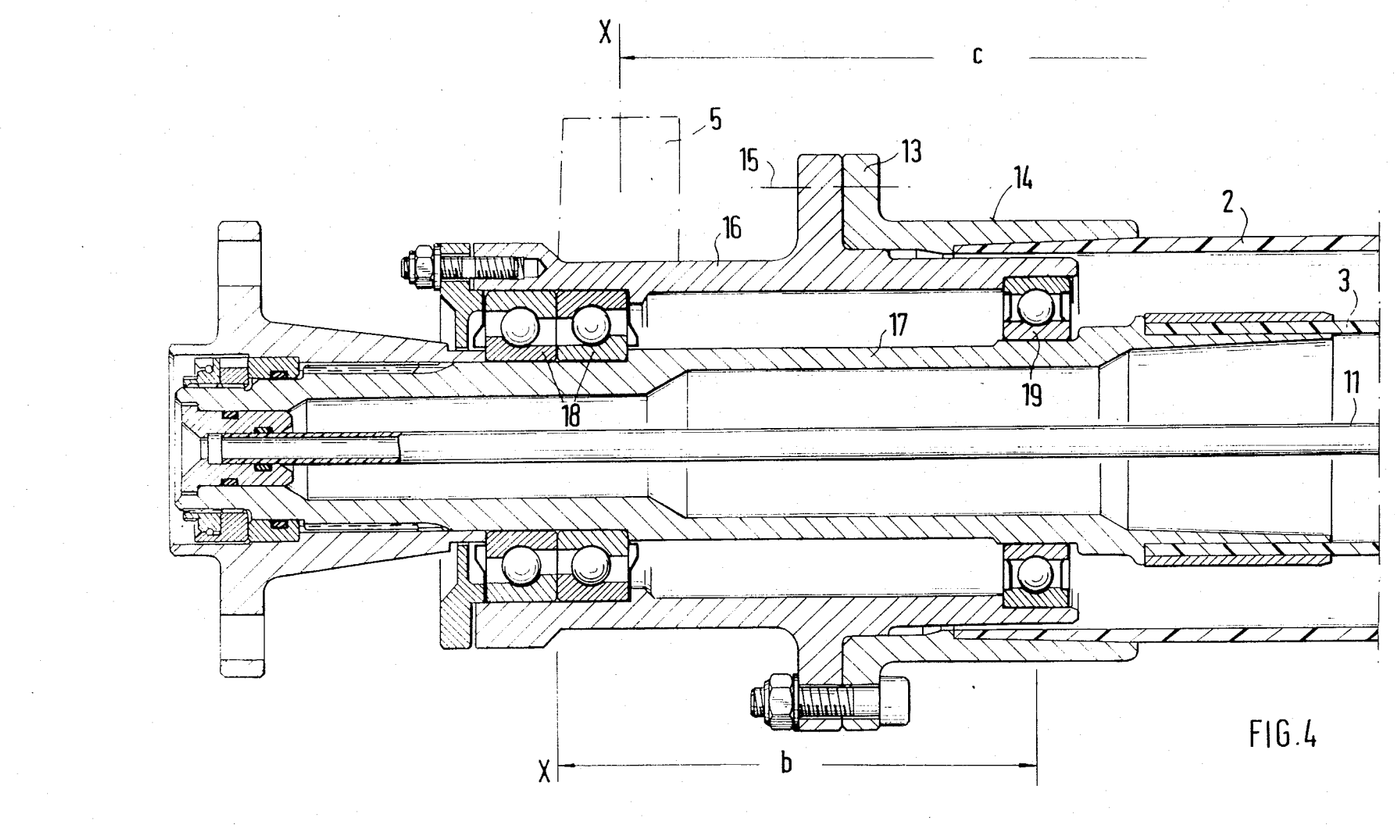
FIG. 4 is a cross-sectional view through the aircraft rear end of the tubular support member with a propeller bearing support in accordance with the present invention.

According to FIG. 4, the tubular support member 2 is connected at its end facing the propeller 4 with a sleeve 14 having a flange 13 which is secured by way of threaded means 15 at an outer bearing sleeve 16. An extension part 17 of the drive shaft 3 is supported in this bearing sleeve 16 by way of bearings 18 and 19 which form a relatively large base b with respect to the bearing support of the propeller 4. The sole rear elastic bearing support 5 for the tubular support member 2 is provided approximately in a vertical plane X—X with the bearing 18. This elastic bearing support 5 is arranged between two bearing elements 20 and 21 whereby the one element 20 is retained on the bearing sleeve 16 and the other element 21 at a wall of the fuselage 8 (FIG. 1).

The bearing support 18 is constructed as fixed bearing support so that the propeller axial forces are introduced directly into the central tubular member and into the fuselage. It is assured thereby that both the CFK-central shaft as also the transmission are free of propeller thrust forces.

Figure 9:
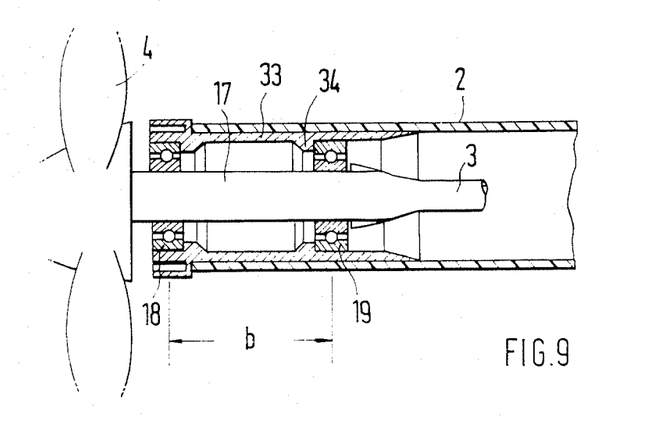
FIG. 9 is a cross-sectional view through still a further embodiment of a bearing sleeve connected with the tubular support member in accordance with the present invention which receives the propeller bearing support.

According to a further embodiment according to FIG. 9, the tubular support member 2 is connected with an inserted bearing sleeve 33 which is adhesively secured in a construction of plastic material. The bearings 18 and 19 are arranged inside the sleeve 33 which are retained in the axial direction by way of integrated support rings 34.

Figure 5:
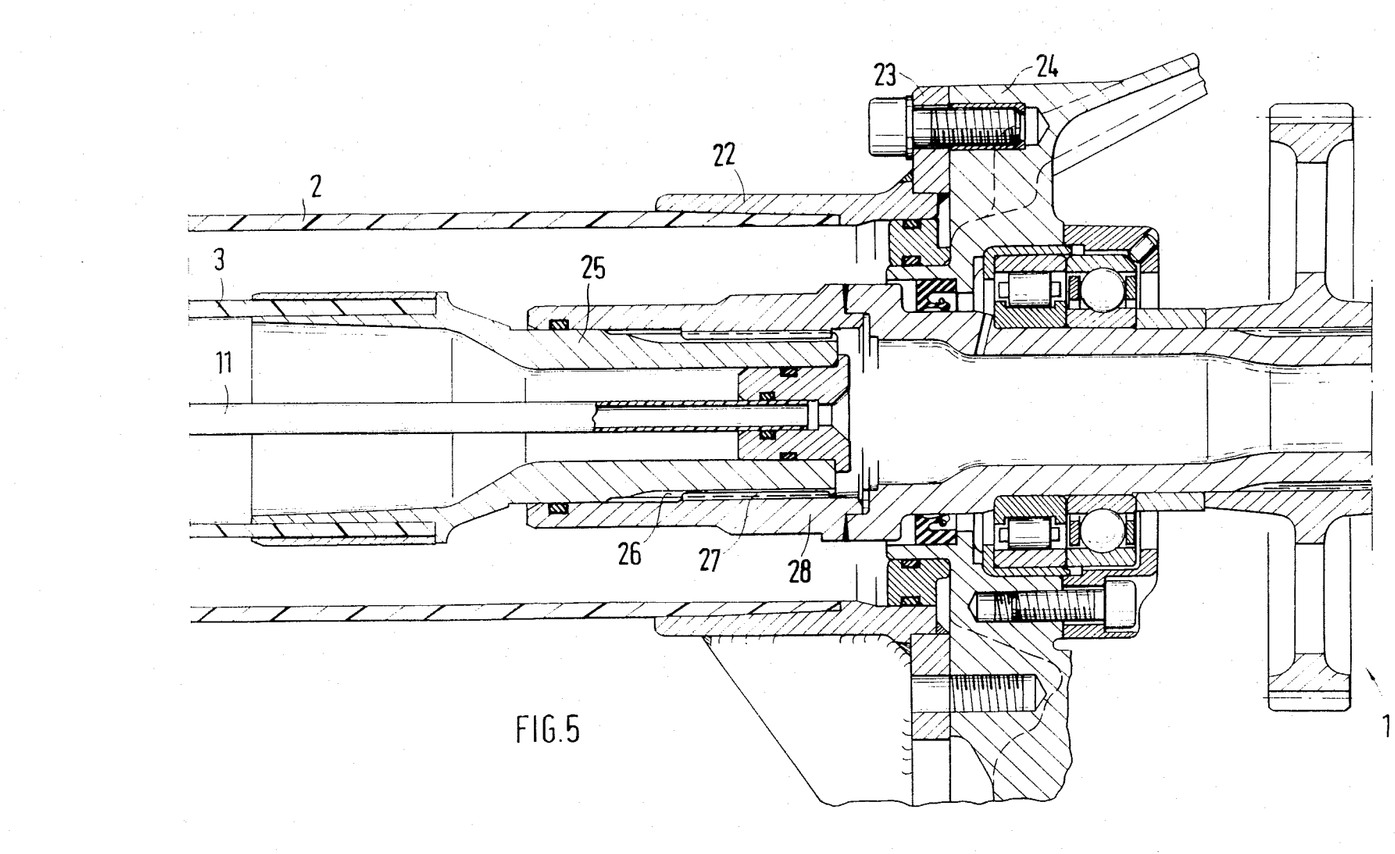
FIG. 5 is a cross-sectional view through the end of the tubular support member on the side of the transmission with connection to a transmission cover in accordance with the present invention.

The tubular support member 2 is connected with a sleeve element 22 at the end of the tubular support member 2 opposite the propeller 4 (FIG. 5); the sleeve element 22 is secured by way of a flange 23 at a transmission cover 24. The central shaft 3 is provided at this end with a reducing sleeve 25 which has on the outside thereof a longitudinal splined arrangement 26 that is in engagement with an internal splined arrangement 27 of a transmission output shaft 28. This splined arrangement serves for the tolerance absorption and for the axial decoupling in connection with the end-side propeller bearing support.

Figure 7:
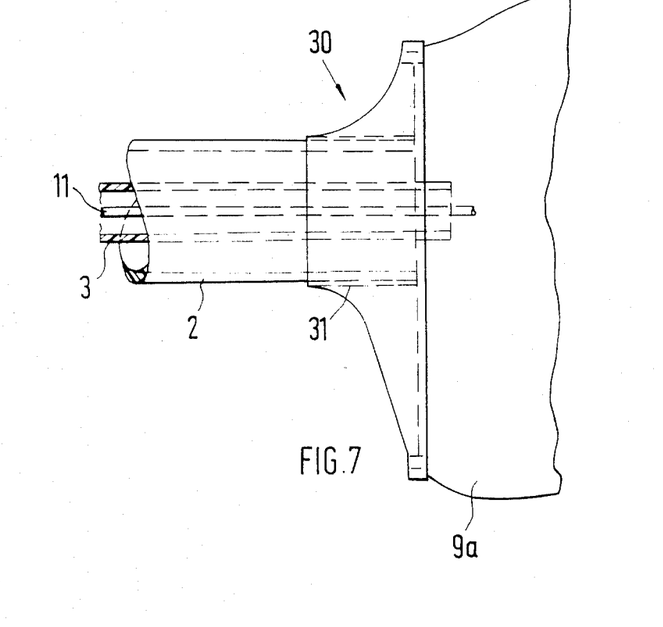
FIG. 7 is a partial elevational view of a closure cover member retained at the transmission in accordance with the present invention which includes a sleeve-shaped mounting part for receiving the tubular support member.

According to a further embodiment according to FIG. 7, the closure cover 30 of the transmission housing may be so constructed by means of a sleeve-shaped mounting part 31 that the tubular support member 2 is retained in the same with its free end. With a construction of plastic material, the tubular member 2 is connected with the cover 13 by a known winding method. A force-absorption element is arranged inside the cover 30.

Figure 3:
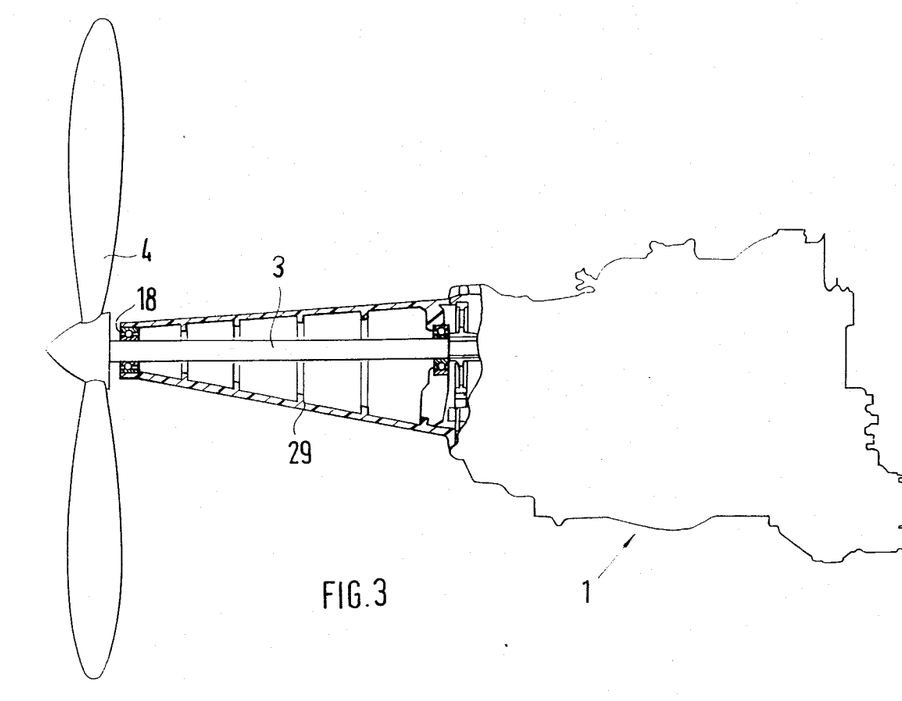
FIG. 3 is a side elevational view of another embodiment in accordance with the present invention with a funnel-shaped transmission cover replacing the tubular support member.

According to still another embodiment (FIG. 3), in lieu of the cylindrical tubular support member 2, also a funnel-shaped transmission cover 29 of plastic material may be used which extends up to the thrust propeller 4 and includes the bearing 18 at the funnel end. The fuselage 8 then extends about this transmission cover.

Figure 8:
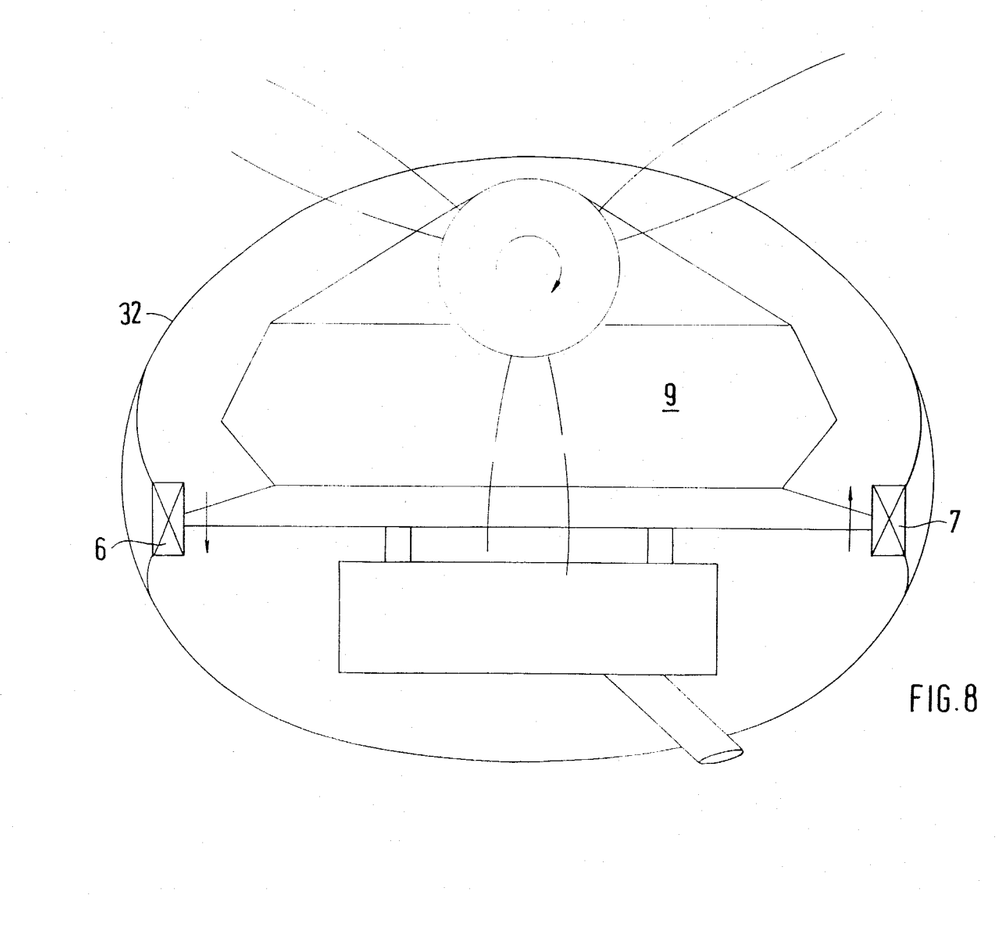
FIG. 8 is a rear elevational view in principle on a drive aggregate in accordance with the present invention supported on the side of the fuselage.

Appropriately, the engine bearing supports 6 and 7 are supported at a rigid location of the fuselage wall 32 whereby the bearing supports are retained laterally of the engine 9. As indicated by the arrows in FIG. 8, an introduction of the torque occurring during the operation is possible thereby.

While we have shown and described several embodiments in accordance with the present invention, it is understood that the same is not limited thereto but is susceptible of numerous changes and modifications as known to those skilled in the art, and we therefore do not wish to be limited to the details shown and described herein, but intend to cover all such changes and modifications as are encompassed by the scope of the appended claims.

We claim:

1. A drive arrangement for an aircraft of the type having a fuselage housing a drive unit which is operatively connected to drive a propeller, comprising:
   a longitudinally installed tubular support means connected at one end with the drive unit,
   a central propeller driving shaft supported in the tubular support means and drivingly interconnecting the drive unit with the propeller,
   and at least three bearing support means for supporting the drive unit and tubular support means at the fuselage, a first of the bearing support means being provided adjacent the propeller end of the tubular support means for supporting the tubular support means, the other bearing support means being provided in the area of the drive unit for supporting the drive unit,
   wherein the tubular support means consists of a glass fiber-reinforced plastic material and wherein the central shaft made of carbon-fiber-reinforced plastic material is supported in the tubular support means.

2. A drive arrangement according to claim 1, wherein the propeller is disposed at the rear of the aircraft.

3. A drive arrangement according to claim 2, wherein the drive unit includes an engine and a transmission arranged at the fuselage end.

4. A drive arrangement according to claim 3, wherein the central shaft is retained in the tubular support means by way of bearing means in vertical planes of the overall aggregate, consisting of an engine-transmission unit, tubular support means, central shaft and propeller.

5. A drive arrangement according to claim 2, wherein the central shaft is constructed tubularly shaped and accommodates a pressure oil line which is held resonant-free in support bearings of the tubular support means.

6. A drive arrangement according to claim 3, wherein the tubular support means is adhesively connected with its end facing the transmission with an emplaced sleeve means and wherein said sleeve means is connected by way of fastening means rigidly with a transmission cover of the drive unit.

7. A drive arrangement according to claim 3, wherein a closure cover means of a transmission housing includes a sleeve-shaped mounting member for the tubular support means, said mounting member being connected with the tubular support means.

8. A drive arrangement according to claim 3, wherein a transmission cover means of the drive unit is constructed funnel-shaped and is arranged inside of the fuselage and extends substantially over the entire length of the central shaft, and wherein an end-face mounting means for a support bearing of the propeller is provided at the free end of said cover means.

9. A drive arrangement according to claim 2, wherein the aircraft rear end of the tubular support means facing the propeller includes elastic bearing support means arranged between two bearing elements, and wherein one bearing element is connected with the tubular support means and the other bearing element with a wall of the fuselage.

10. A drive arrangement as claimed in claim 2, wherein the overall aggregate, consisting of an engine-transmission unit, tubular support means, central shaft and propeller, is suspended over a relatively large base in the bearing support means in a sound-insulating manner having soft characteristics.

11. A drive arrangement according to claim 9, wherein the bearing support means are arranged in two vertical cross planes and said cross planes are located in low-vibration areas of the aggregate, consisting of an engine-transmission unit, tubular support means, central shaft and propeller, and the bearing support means of the engine being located approximately in the cross plane extending through the center of gravity and near the axis of the propeller.

12. A drive arrangement according to claim 11, wherein the engine bearing support means are arranged in a relatively stiff area in a wall of the aircraft fuselage.

13. A drive arrangement according to claim 2, wherein the central shaft includes a reducing sleeve having external longitudinal splines which are in engagement longitudinally displaceably with internal longitudinal splines of a transmission output shaft.

14. A drive arrangement according to claim 2, wherein the aircraft rear end of the tubular support means facing the propeller is rigidly connected by way of a flange sleeve with an outer bearing sleeve, and wherein propeller bearing means, including its support bearings, is clamped in on a relatively large support base between said outer bearing sleeve and an inner transmission sleeve connected with the central shaft.

15. A drive arrangement according to claim 14, wherein the support bearing is constructed as a fixed bearing.

16. A drive arrangement according to claim 2, wherein the tubular support means is adhesively connected with an inserted bearing sleeve and said last-mentioned sleeve carries support bearings for the propeller which are retained in position in the axial direction by way of support rings integrated into said sleeve.

17. A drive arrangement according to claim 2, wherein the central shaft is retained in the tubular support means by way of bearing means in vertical planes of the overall aggregate, consisting of an engine -transmission unit, tubular support means, central shaft and propeller.

18. A drive arrangement according to claim 2, wherein the central shaft is constructed tubularly shaped and accommodates a pressure oil line which is held resonant-free in support bearings of the tubular support means.

19. A drive arrangement for an aircraft of the type having a fuselage housing a drive unit which is operatively connected to drive a propeller, comprising:
   a longitudinally installed tubular support means connected at one end with the drive unit,
   a central propeller driving shaft supported in the tubular support means and drivingly interconnecting the drive unit with the propeller,
   and at least three bearing support means for supporting the drive unit and tubular support means at the fuselage, a first of the bearing support means being provided adjacent the propeller end of the tubular support means for supporting the tubular support means, the other bearing support means being provided in the area of the drive unit for supporting the drive unit, wherein the aircraft rear end of the tubular support means facing the propeller is rigidly connected by way of a flange sleeve with an outer bearing sleeve, and wherein propeller bearing means, including its support bearings, is clamped in on a realtively large support base between said outer bearing sleeve and an inner transmission sleeve connected with the central shaft.

20. A drive arrangement according to claim 19, wherein the propeller is disposed at the rear of the aircraft.

21. A drive arrangement according to claim 20, wherein the support bearing is constructed as a fixed bearing.

22. A drive arrangement for an aircraft of the type having a fuselage housing a drive unit which is operatively connected to drive a propeller, comprising:

a longitudinally installed tubular support means connected at one end with the drive unit, a central propeller driving shaft supported in the tubular support means and drivingly interconnecting the drive unit with the propeller, and at least three bearing support means for supporting the drive unit and tubular support means at the fuselage, a first of the bearing support means being provided adjacent the propeller end of the tubular support means for supporting the tubular support means, the other bearing support means being provided in the area of the drive unit for supporting the drive unit, wherein the central shaft is constructed tubularly shaped and accommodates a pressure oil line which is held resonant-free in support bearings of the tubular support means.

23. A drive arrangement according to claim 22, wherein the propeller is disposed at the rear of the aircraft.

24. A drive arrangement according to claim 22, wherein the aircraft rear end of the tubular support means facing the propeller is rigidly connected by way of a flange sleeve with an outer bearing sleeve and wherein propeller bearing means including its support bearings is clamped in on a relatively large support base between said outer bearing sleeve and an inner transmission sleeve connected with the central shaft.

* * * * *